Figure 1:
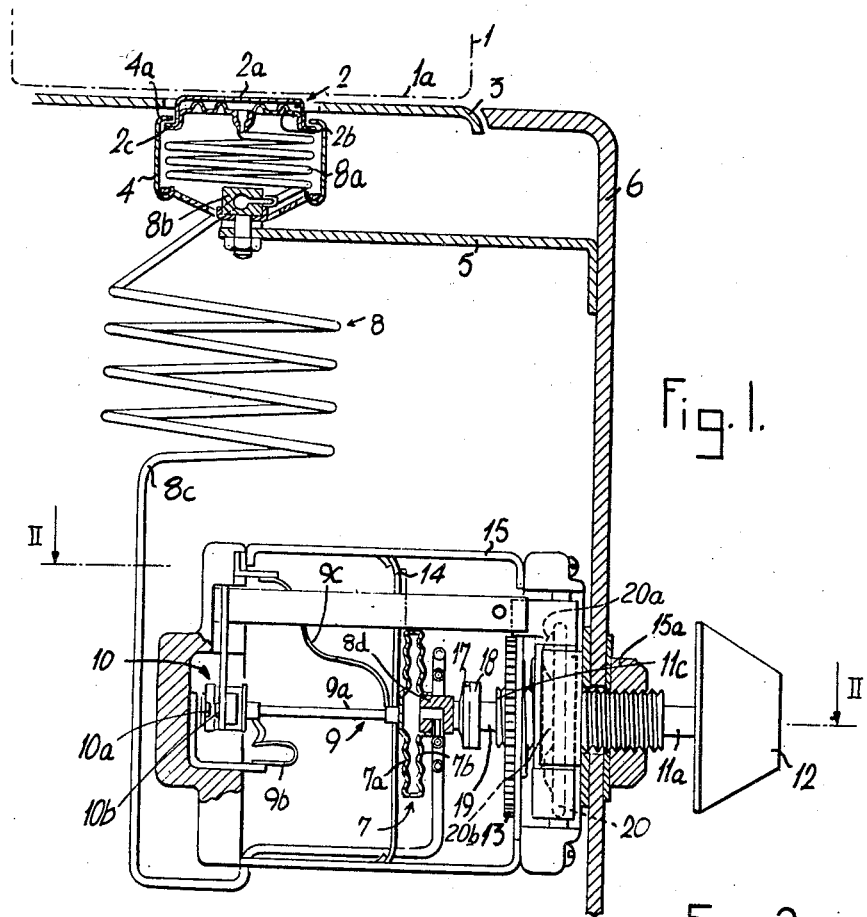

April 6, 1965  T. S. ASHE ETAL  3,177,320
ELECTRIC SWITCH DEVICES FOR CONTROLLING THE TEMPERATURE OF
THE MEANS TO BE HEATED BY ELECTRICAL HEATING APPARATUS
Filed June 29, 1961

INVENTORS
THOMAS STUART ASHE
GEORGE CAVELL THOMPSON
ATTORNEY

United States Patent Office 3,177,320
Patented Apr. 6, 1965

3,177,320
ELECTRIC SWITCH DEVICES FOR CONTROLLING THE TEMPERATURE OF THE MEANS TO BE HEATED BY ELECTRICAL HEATING APPARATUS
Thomas Stuart Ashe, Sawbridgeworth, near Bishops Stortford, and George Cavell Thompson, Harlow, England, assignors to Associated Electrical Industries Limited, London, England, a British company
Filed June 29, 1961, Ser. No. 120,568
Claims priority, application Great Britain, July 5, 1960, 23,498/60
5 Claims. (Cl. 200—140)

This invention relates to electric switch devices for controlling the temperatures of enclosures or vessels heated by electrical cooking or heating apparatus.

According to the present invention an electric switch device for controlling the temperature of an enclosure or a vessel to be heated by an electrical cooking or heating apparatus comprises a switch having positively separable contacts for controlling by the ratio of the closed to open time of the contacts the electric power supplied to the apparatus, thermally responsive contact operating means consisting of the combination of a linearly expansible current heated means, energisable under control of the contacts, and an expansible diaphragm or bellows of an hydraulic temperature sensing arrangement, which diaphragm or bellows is connected hydraulically with a temperature sensing capsule, bulb or other element adapted for response to the temperature of the enclosure or vessel and, which diaphragm or bellows is positioned in a straight line with the current heated means and between a manual adjustment, screw or other means and the switch so that their expansions will be added directly together to operate the switch whereby to provide for the temperature control of the vessel or enclosure at a temperature selected by the manual adjusting means by reduction of the electric power supplied to the apparatus at a temperature below the temperature selected for the vessel or enclosure, proportionately in accordance with the temperature of the vessel or enclosure.

The positively separable electric switch contacts will generally be part of an electric snap action micro gap switch of the type well-known in itself and the separation of the contacts will generally be arranged to de-energise the heating or cooking apparatus and the expansible current heated means but may instead be arranged to reduce the current supplied to either of or both the current heated expansible means and the controlled apparatus.

The linearly expansible current heated means may conveniently comprise a rod of for example aluminium and a separate heater or, where a faster response time is required, may comprise a strut of thin material and of tubular, or other buckling resistant cross-section compared with a flat strip, and which strut is arranged to be electrically heated by passing electric current through the strut itself.

Figure 2:
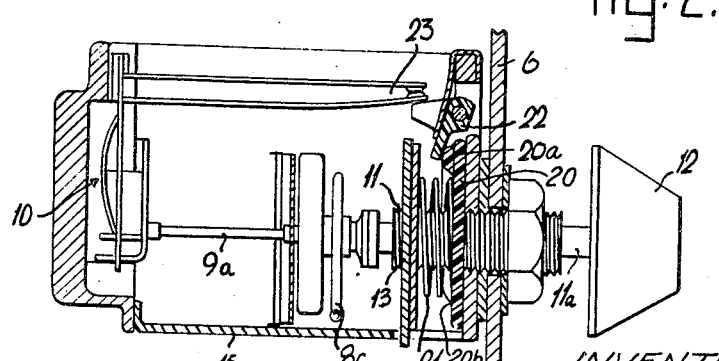

One embodiment of the temperature control electric switch device according to the invention will now be described by way of example with reference to the accompanying drawing, in which:

FIG. 1 is an elevation partly in section of the switch device mounted in an electric cooker; and FIG. 2 is a sectional view of part of the switch device of FIG. 1, taken along line II—II in FIG. 1.

In the drawing there is shown a temperature control electric switch for controlling the temperature, in this instance, of a pan 1, part only of which is shown and in chain dotted line. The electric switch device comprises a temperature sensing disc-like capsule 2 positioned centrally of an electric hot-plate, indicated diagrammatically at 3, and which is arranged to heat the pan. The capsule is arranged to be biased into contact with the under surface 1a of the pan so as to sense the temperature of the latter. The top surface 2a of the capsule is flat and the under surface of the capsule 2b has a number of depressions which extend upwards in the figure and are welded to the top surface to restrict relative movement of the surfaces 2a and 2b. The capsule 2 is thermally shielded by a shield 4 so as to substantially restrict the heat received from the hot-plate directly, the capsule being movable mounted in the shield. The shield is fixed, for example being carried by an arm 5 fixed to an electric cooker 6, of which hot-plate is part.

The capsule is connected hydraulically with an expansible diaphragm 7 by means of a capillary tube 8 having a coiled portion 8a which serves as a spring, acting between a fixed boss 8b and the capsule to bias the capsule into contact with the pan when the latter is on the hot-plate. The capsule is formed as a "top hat," the brim 2c of which engages a flange 4a on the shield to limit upward movement of the capsule when the pan is not on the plate. A part of the tube 8c connects the boss 8b with a boss 8d on the diaphragm, the tube 8a being coiled as indicated in the figure.

The diaphragm consists of two corrugated discs 7a and 7b having their peripheries turned over toward one another to form cylinders which peripheries are welded together to complete the diaphragm shown.

The diaphragm is arranged in a straight line with a current heated linearly expansible means 9 between a snap action micro gap switch 10 (shown schematically in FIG. 2) which is of the type well-known in itself and has contacts 10a and 10b, and an adjustment screw 11 movable with respect to a knurled nut 13 by a knob 12. The diaphragm is located by a spring cross member 14 carried by a casing 15, which cross member also serves to bias the diaphragm to provide the correct initial loading thereof and so that a disc 17 is pressed against a disc 18 carried by a stud 19 which is freely received in a bore (not shown) in the screw 11 so that rotation of the screw moves the stud longitudinally but does not rotate the stud 19.

The current heated means 9 comprises a tube 9a of thin walled material of high co-efficient of linear expansion and electrical resistance and end caps of electrical insulating material for example steatite.

The tube 9a is arranged to be heated by current passing through the tube and is connected in series with the heating element (not shown) of the electrical cooking of heating apparatus and with the switch, by flexible connections 9b and 9c, so as to be energised with the heating element when the switch is closed and de-energised when the switch is open.

With the device set at a temperature selected by the manual adjustment knob 12 full power is initially delivered to the electric cooking apparatus until a predetermined lower temperature than the selected one is reached. After that continued expansion of the diaphragm 7 caused by expansion of hydraulic fluid from the capsule 2 in response to rise in temperature of the pan 1 proportionately reduces the setting of the device to reduce the power delivered to the cooking apparatus merely to that necessary to hold the pan at the selected temperature. In other words an anticipatory control is provided to offset continued heating by the thermal mass of the hot-plate by making the device a proportional controller.

As shown in the figures, the adjusting screw 11 carries on its spindle 11a a cam 20 biased against the switch casing by a spring 21 and arranged to operate by means of a pivoted bell crank 22 further contacts 23, the provision of which is well-known in itself the bell crank 22 being lifted by the raised part 20a of the cam 20x. In the OFF position of the knob 12, the bell crank 22 is received in a recess 20b in the cam 20 so that the contacts 23 are opened to provide an additional set of open contacts to those 10a, 10b of the switch 10. The extra contacts 23 and the cam 20, spring 21, pivoted bell crank 22 and further contacts 23 can all be omitted if desired, the switch 10 being relied on to open the circuit of the hot plate 3 in the OFF position.

Further adjustment may be provided by a shunt in parallel with the rod-like element and which shunt may be automatically introduced by the adjustment screw or other means at a suitable position thereof.

In some circumstances, it may be desirable to provide a separate heater and use a rod as the expanding element instead of a tube in which case the current will not pass through the rod but will pass through the heater which will be in series with the hot-plate.

In some circumstances it may be desirable to position the diaphragm between the end of the tube adjacent the switch and the switch.

In the figure, the casing 15 is mounted on the cooker 6 by fixing nut 15a.

What we claim is:

1. An electric switch device for controlling the temperature of means to be heated by an electrical heating apparatus comprising a casing, a switch mounted in the casing and having positively separable contacts connectible in circuit with the electric heating apparatus such that the latter will be energised while the contacts are closed and the energisation of the apparatus will be reduced when the contacts are separated, an hydraulic temperature sensing arrangement having an hydraulically expansible element supported in the casing, a temperature sensing element positioned to be sensitive to the means to be heated and connected hydraulically with said expansible element to cause expansion of the latter in accordance with the temperature of the means to be heated, a linearly expansible strut of thin material and of buckling resistant cross-section perpendicular to its length, which strut is connected in circuit with the contacts of the switch means so as to be electrically heated by passing electric current through the strut itself only when the contacts are closed, said hydraulically expansible element and said strut being operatively connected with one another such that their expansions are added together, and manual adjustment means carried by the casing and connected with the hydraulically expansible element such that the relationship of the expansible element and strut with respect to the switch means can be altered to select the temperature of said means to be heated, whereby the contacts initially closed will be opened to reduce the power supplied to the heating apparatus at a temperature below that selected by the adjustment means proportionately in accordance with the actual temperature of the means to be heated by reduction of the ratio of open to closed time of the contacts.

2. An electric switch device as claimed in claim 1, in which the strut is positioned in the casing a straight line with the expansible member and between the latter and the switch means, and in which the adjustment means acts on the expansible member to vary its position and that of the strut with respect to the switch means.

3. An electric switch device as claimed in claim 1, in which the strut comprises a tube.

4. An electric switch device as claimed in claim 3, in which the tube has end caps of electrical insulating material and flexible electrical connections arranged so as to provide the energisation of the tube only when the contacts of the switch means are closed.

5. An electric switch device as claimed in claim 1, in which the manual adjustment means comprises a nut carried by the casing in which a screw member is threaded.

References Cited by the Examiner

UNITED STATES PATENTS

| | | | |
|---|---|---|---|
| 2,192,853 | 3/40 | Hastings | 200—122 |
| 2,476,498 | 7/49 | Lofgren | 200—137 |
| 2,611,850 | 9/52 | Walton | 200—122 |
| 2,705,747 | 4/55 | Strange | 200—137 |
| 2,722,613 | 11/55 | Culbertson et al. | 200—122 X |
| 2,862,093 | 11/58 | Lennox | 200—122 |
| 2,902,567 | 9/59 | Weber et al. | 200—122 |
| 2,914,644 | 11/59 | Holtkamp | 200—122 |

BERNARD A. GILHEANY, *Primary Examiner.*